(12) United States Patent
Hirata (10) Patent No.: US 9,450,526 B2
(45) Date of Patent: Sep. 20, 2016

(54) IMAGE FORMING APPARATUS, METHOD OF CONTROLLING IMAGE FORMING APPARATUS, AND STORAGE MEDIUM

(71) Applicant: BROTHER KOGYO KABUSHIKI KAISHA, Nagoya-shi, Aichi-ken (JP)

(72) Inventor: Hironori Hirata, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 14/620,538

(22) Filed: Feb. 12, 2015

(65) Prior Publication Data
US 2015/0236627 A1    Aug. 20, 2015

(30) Foreign Application Priority Data

Feb. 17, 2014   (JP) .................................. 2014-027321

(51) Int. Cl.
| | |
|---|---|
| H02P 6/18 | (2016.01) |
| H02P 6/20 | (2016.01) |
| B41J 2/47 | (2006.01) |
| H02P 6/16 | (2016.01) |

(52) U.S. Cl.
CPC ................ H02P 6/181 (2013.01); B41J 2/471 (2013.01); H02P 6/16 (2013.01); H02P 6/182 (2013.01); H02P 6/20 (2013.01)

(58) Field of Classification Search
CPC .......... B41J 2/435; B41J 2/471; H02P 6/18; H02P 6/181; H02P 6/182; H02P 6/20; H02P 6/16
See application file for complete search history.

(56) References Cited

U.S. PATENT DOCUMENTS

| | | | |
|---|---|---|---|
| 5,019,756 A | 5/1991 | Schwarz | |
| 6,396,225 B1 * | 5/2002 | Wakui | H02P 6/085 318/400.01 |
| 6,476,370 B1 | 11/2002 | Suzuki et al. | |
| 7,327,378 B2 * | 2/2008 | Han | H02P 6/182 347/243 |
| 2002/0074968 A1 | 6/2002 | Mitsuda | |

(Continued)

FOREIGN PATENT DOCUMENTS

| | | |
|---|---|---|
| JP | 6-284783 A | 10/1994 |
| JP | 10-225079 A | 8/1998 |

(Continued)

OTHER PUBLICATIONS

Office Action issued in related application JP 2009-088404, mailed Feb. 10, 2011.

(Continued)

*Primary Examiner* — Sarah Al Hashimi
(74) *Attorney, Agent, or Firm* — Merchant & Gould P.C.

(57) ABSTRACT

An image forming apparatus includes: a light source; a polygon mirror; a brushless motor rotating a rotary polygon mirror; a light receiver configured to receive the light beam reflected by the polygon mirror; and a controller configured to perform driving control; detect a value related to an induced voltage; and perform a phase switching process. In a start-up period, the controller performs a control switching process of performing switching from rotation speed control based on the induced voltage to rotation speed control based on the light receiving timing of the light beam in a specific range in which a length from a start timing of an interruption period of the power to a timing when the detected value reaches the reference value does not become shorter than a length of a reference-disabled period.

23 Claims, 7 Drawing Sheets

(56) References Cited

U.S. PATENT DOCUMENTS

| | | |
|---|---|---|
| 2003/0052633 A1 | 3/2003 | Inagaki et al. |
| 2003/0107337 A1 | 6/2003 | Kokami et al. |
| 2004/0207717 A1 | 10/2004 | Han et al. |
| 2005/0281545 A1 | 12/2005 | Sugimoto et al. |
| 2006/0139442 A1 | 6/2006 | Kurita |
| 2006/0208179 A1 | 9/2006 | Itami |
| 2009/0129017 A1 | 5/2009 | Takada |
| 2010/0245521 A1 | 9/2010 | Kubo |
| 2011/0242259 A1* | 10/2011 | Kubo ............... B41J 2/471 347/224 |

FOREIGN PATENT DOCUMENTS

| | | |
|---|---|---|
| JP | 11-129538 A | 5/1999 |
| JP | 11-222337 A | 8/1999 |
| JP | 2000-316294 A | 11/2000 |
| JP | 2001-174728 A | 6/2001 |
| JP | 2003-189674 A | 7/2003 |
| JP | 2004-326105 A | 11/2004 |
| JP | 2007-62266 A | 3/2007 |
| JP | 2007-236090 A | 9/2007 |
| JP | 2007236090 A | 9/2007 |
| JP | 2010-237622 A | 10/2010 |

OTHER PUBLICATIONS

Extended European Search Report issued in related EP application 10002753.1, mailed Aug. 3, 2010.

Office Action issued in related U.S. Appl. No. 12/724,751, mailed Apr. 6, 2012.

* cited by examiner

ID image forming apparatus, method of controlling image forming apparatus, and storage medium

CROSS REFERENCE TO RELATED APPLICATION

This application is based upon and claims the benefit of priority of Japanese Patent Application No. 2014-027321 filed on Feb. 17, 2014 the contents of which are incorporated herein by reference in its entirety.

BACKGROUND

The present disclosure relates to an image forming apparatus. More specifically, the present disclosure relates to an image forming apparatus which includes a polygon mirror for reflecting a light beam, and a brushless motor for rotating the rotational position, a method of controlling the image forming apparatus, and a storage medium.

Electrophotographic image forming apparatuses each of which includes a polygon mirror for reflecting a light beam and a brushless motor for rotating the polygon mirror has been put to practical use. As a technology for a brushless motor for acting as the driving source of a polygon mirror, a technology for performing control on rotation without using any Hall element is known.

As a document related to the technology for a brushless motor described above, there is Japanese Patent Application Laid-Open No. 2010-237622 for instance. Japanese Patent Application Laid-Open No. 2010-237622 discloses a technology in which the position of a rotor is specified on the basis of an induced voltage, and when rotation starts, rotation speed control is performed on the basis of the induced voltage, and after the rotation speed reaches a target rotation speed, rotation speed control is performed on the basis of a signal (a BD signal) which is obtained from a sensor which receives a light beam deflected by a polygon mirror.

SUMMARY

However, the above described technology according to the related art has the following problem. That is, in rotation speed control based on the induced voltage, as the rotation speed increases, the accuracy of induced-voltage detection decreases. Meanwhile, if rotation speed control based on the BD signal starts with a low rotation speed, a light beam moves on a photosensitive member, damage to the photosensitive member is feared.

An aspect of the present disclosure was made for solving the above described problem of the technology according to the related art. An object of the present disclosure is to provide a technology for performing switching in rotation speed control at appropriate timings in an image forming apparatus having a brushless motor for driving a polygon mirror.

The aspect of the present disclosure provides the following arrangements:

An image forming apparatus comprising:
a light source configured to emit a light beam;
a polygon mirror configured to reflect the light beam emitted from the light source;
a brushless motor including a plurality of coils, the brushless motor being configured to rotate the polygon mirror;
a light receiver configured to receive the light beam reflected by the polygon mirror; and
a controller configured to:
perform driving control on the brushless motor by switching between supply and interruption of power to each of the plurality of coils;
detect a value related to an induced voltage which is generated in at least one of the plurality of coils in a period of the interruption of the power during the brushless motor is rotated;
perform a phase switching process of referring to the detected value and performing phase switching based on a timing when the detected value reaches a reference value; and
in a start-up period when the brushless motor is started up from a stop state to a target rotation speed, perform a control switching process of performing switching from rotation speed control based on the induced voltage according to the phase switching process to rotation speed control based on the light receiving timing of the light beam by the light receiver in a specific range in which a length from a start timing of an interruption period of the power to a timing when the detected value reaches the reference value does not become shorter than a length of a reference-disabled period in which the induced voltage cannot be detected due to a regeneration current attributable to the phase switching in the phase switching process.

A control method of an image forming apparatus which includes a light source configured to emit a light beam, a polygon mirror configured to reflect the light beam emitted from the light source, a brushless motor configured to rotate the polygon mirror, and a light receiver configured to receive the light beam reflected by the polygon mirror, the method comprising:
performing driving control on the brushless motor by switching between supply and interruption of power to each of the plurality of coils;
detecting a value related to an induced voltage which is generated in at least one of the plurality of coils in a period of the interruption of the power during the brushless motor is rotated;
performing a phase switching process of referring to the detected value and performing phase switching based on a timing when the detected value reaches a reference value; and
in a start-up period when the brushless motor is started up from a stop state to a target rotation speed, performing a control switching process of performing switching from rotation speed control based on the induced voltage according to the phase switching process to rotation speed control based on the light receiving timing of the light beam by the light receiver in a specific range in which a length from a start timing of an interruption period of the power to a timing when the detected value reaches the reference value does not become shorter than a length of a reference-disabled period in which the induced voltage cannot be detected due to a regeneration current attributable to the phase switching in the phase switching process.

A non-transitory computer readable storage medium storing a program to be executed by an image forming apparatus which includes a light source configured to emit a light beam, a polygon mirror configured to reflect the light beam emitted from the light source, a brushless motor configured to rotate the polygon mirror, and a light receiver configured to receive the light beam reflected by the polygon mirror, the program causing the image forming apparatus to execute:

performing driving control on the brushless motor by switching between supply and interruption of power to each of the plurality of coils;

detecting a value related to an induced voltage which is generated in at least one of the plurality of coils in a period of the interruption of the power during the brushless motor is rotated;

performing a phase switching process of referring to the detected value and performing phase switching based on a timing when the detected value reaches a reference value; and in a start-up period when the brushless motor is started up from a stop state to a target rotation speed, performing a control switching process of performing switching from rotation speed control based on the induced voltage according to the phase switching process to rotation speed control based on the light receiving timing of the light beam by the light receiver in a specific range in which a length from a start timing of an interruption period of the power to a timing when the detected value reaches the reference value does not become shorter than a length of a reference-disabled period in which the induced voltage cannot be detected due to a regeneration current attributable to the phase switching in the phase switching process.

DESCRIPTION OF ILLUSTRATIVE EMBODIMENTS

Hereinafter, a printing apparatus according to an illustrative embodiment will be described in detail with reference to the accompanying drawings. The present embodiment can be obtained by applying an aspect of the present disclosure to a printer for forming images in an electrophotographic manner.

Figure 1:
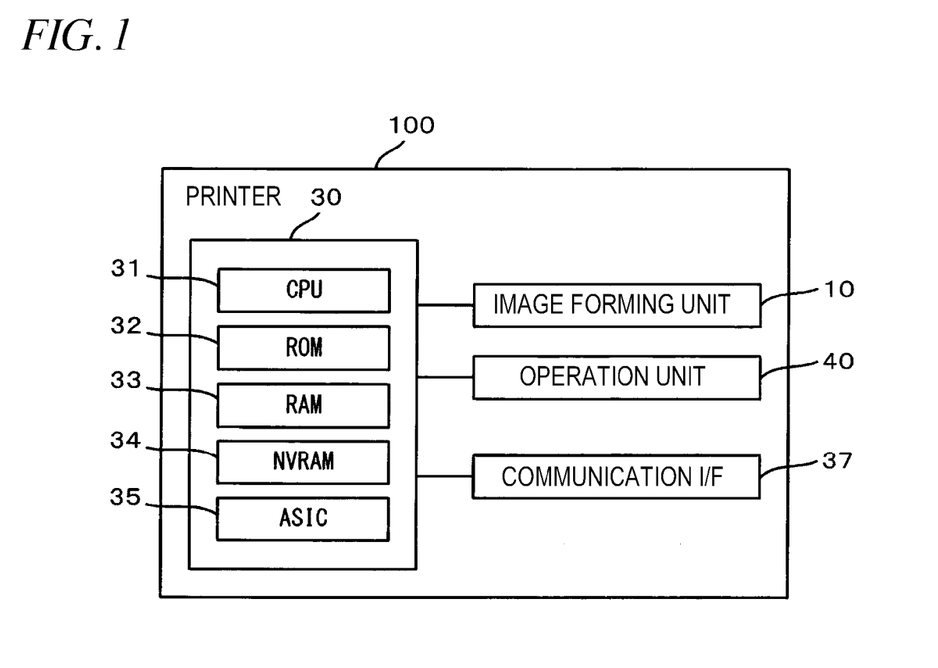
FIG. 1 is a block diagram illustrating the electrical configuration of a printer according to an embodiment.

As shown in FIG. 1, a printer 100 of the present embodiment includes a controller 30, which includes a CPU 31, a ROM 32, a RAM 33, a non-volatile RAM (NVRAM) 34, and an ASIC 35. Also, the printer 100 includes an image forming unit 10 which forms images in an electrophotographic manner, an operation unit 40 which receives input operations from a user, and a communication interface 37 for connection with an external device. The image forming unit 10, the operation unit 40, and the communication interface 37 are controlled by the CPU 31. Also, the controller 30 of FIG. 1 is the general term for hardware which is used for control of the printer 100, and does not always mean a single piece of hardware actually existing in the printer 100.

The ROM 32 stores firmware which is control programs for controlling the printer 100, various options, initial values, etc. The RAM 33 is used as a work area into which various control programs are read, or as a storage area for temporarily storing image data.

According to control programs read from the ROM 32 and signals transmitted from a variety of sensors, the CPU 31 controls each component of the printer 100 while storing the process results in the RAM 33 or the NVRAM 34. The CPU 31 is an example of a controller. Also, the controller 30 may be the controller, or the ASIC 35 may be the controller.

The communication interface 37 is hardware for enabling the printer to perform communication with other devices. Specific examples of the communication interface 37 include a network interface, a serial communication interface, and a parallel communication interface. The printer 100 can receive image data to be a print target in the image forming unit 10, from an external device through the communication interface 37.

The operation unit 40 is provided on the exterior of the printer 100, and has a variety of buttons for receiving input operations from the user, and a touch panel for displaying messages and set contents. Examples of the variety of buttons include an execution button for inputting an instruction for starting image processing, and a cancellation button for inputting an instruction for canceling image processing. Also, the operation unit 40 receives a variety of inputs even by touch of user's finger on the touch panel.

Subsequently, the configuration of the image forming unit 10 of the printer 100 will be described with reference to FIG. 2. The image forming unit 10 includes a process unit 50 which forms a toner image in an electrophotographic manner and transfers the toner image onto a paper sheet, an exposing unit 3 which irradiates the process unit 50 with light, a conveyance belt 7 which conveys the paper sheet to the transfer position of the process unit 50, a fixing unit 8 which fixing the unfixed toner on the paper sheet, a paper feeding tray 91 where paper sheets before image transfer are mounted, and a paper discharge tray 92 where paper sheets after image transfer are mounted.

Figure 2:
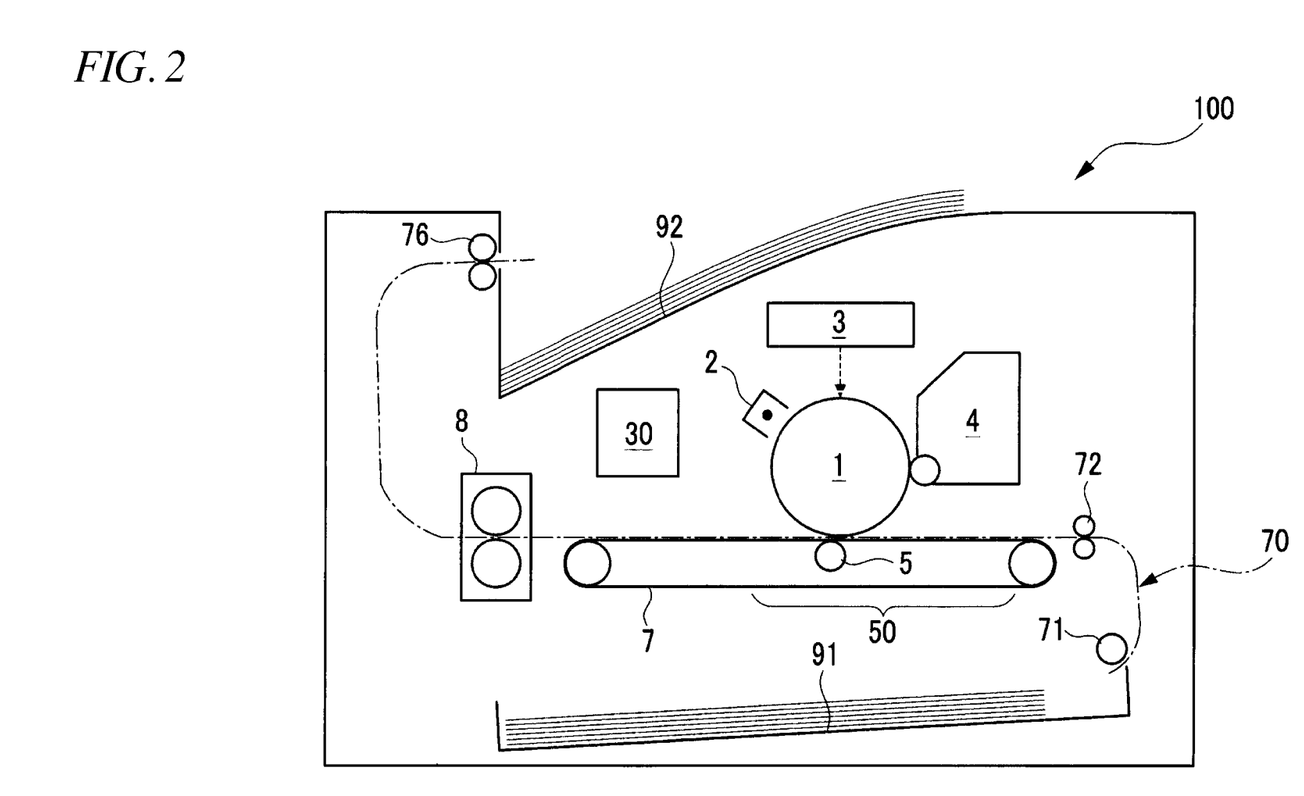
FIG. 2 is a view illustrating the internal configuration of the printer shown in FIG. 1.

Also, inside the image forming unit 10, a conveyance path 70 is formed substantially in a letter S shape as shown by an alternate long and short dash line in FIG. 2 such that a paper sheet stored in the paper feeding tray 91 positioned at the bottom is guided to the paper discharge tray 92 positioned at the upper portion, through a paper feeding roller 71, resist rollers 72, the process unit 50, the fixing unit 8, and paper discharging rollers 76.

The process unit 50 includes a drum-like photosensitive member 1, a charging unit 2 which uniformly charges the surface of the photosensitive member 1, a developing unit 4 which develops an electrostatic latent image with toner, and a transfer unit 5 which transfers the toner image on the photosensitive member 1 onto a sheet. The photosensitive member 1 and the transfer unit 5 are disposed so as to be in contact with the conveyance belt 7.

In the process unit 50, the surface of the photosensitive member 1 is uniformly charged by the charging unit 2. Thereafter, the photosensitive member 1 is irradiated with light from the exposing unit 3, whereby an electrostatic latent image of an image to be formed on a paper sheet is formed on the surface of the photosensitive member 1. Next, toner is supplied to the photosensitive member 1 through the developing unit 4. As a result, the electrostatic latent image on the photosensitive member 1 is visualized, that is, a toner image is formed.

The image forming unit 10 takes out paper sheets mounted on the paper feeding tray 91, one by one, and conveys each paper sheet onto the conveyance belt 7. Then, the toner image formed in the process unit 50 is transferred onto a paper sheet. Thereafter, the paper sheet having the toner image transferred thereon is conveyed to the fixing unit 8 where the toner image is thermally fixed on the paper sheet. Thereafter, the paper sheet is discharged onto the paper discharge tray 92.

Figure 3:
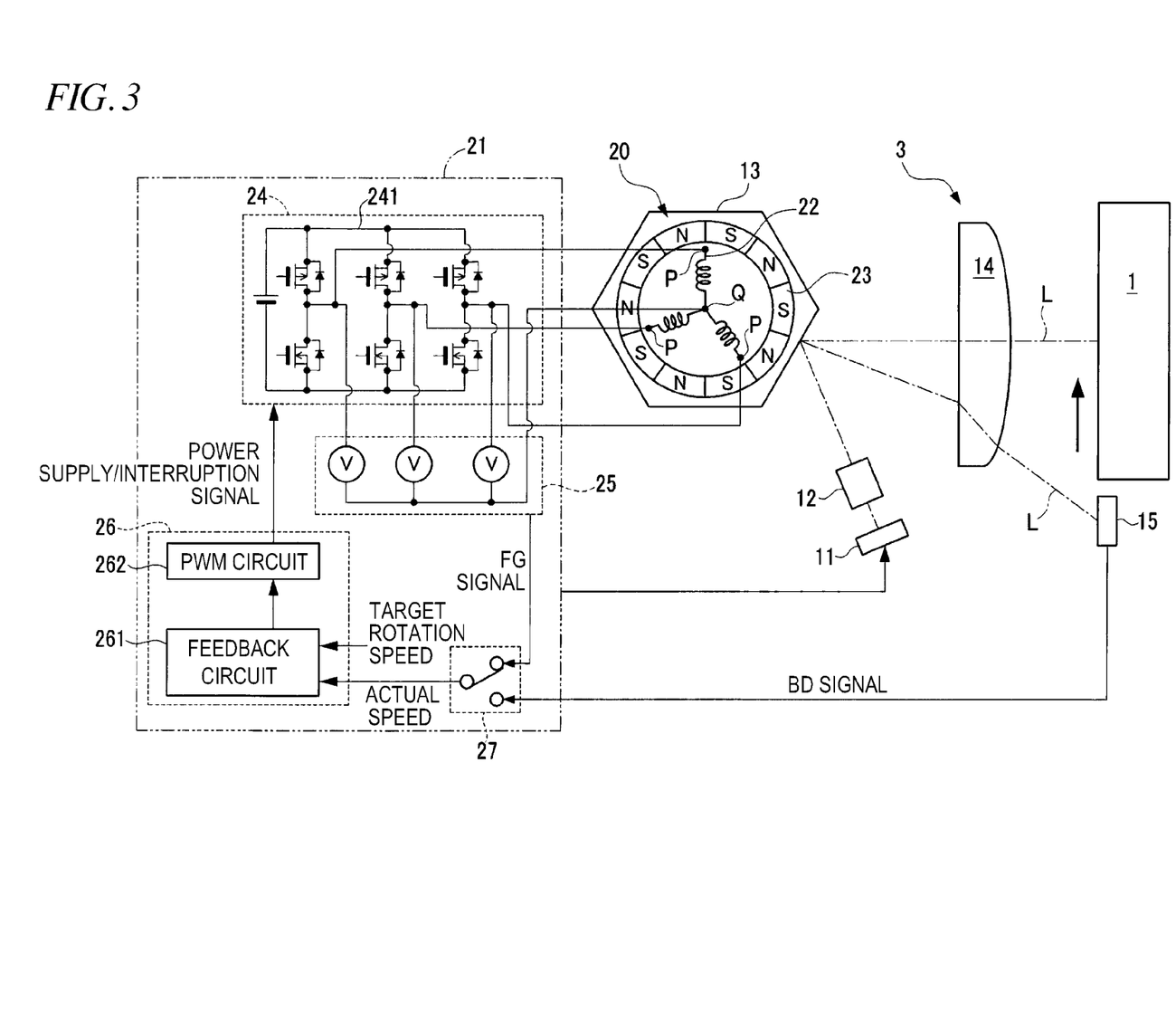
FIG. 3 is a schematic diagram illustrating the configuration of an exposing unit.

Subsequently, the configuration of the exposing unit 3 of the printer 100 will be described with reference to FIG. 3. The exposing unit 3 includes a laser diode LD 11 which emits a laser beam L, a first lens unit 12, a polygon mirror 13, a second lens unit 14, a beam detector (BD) 15, a brushless motor 20, and a control board 21. The LD 11 is an example of a light source. The polygon mirror 13 is an example of a polygon mirror. The BD 15 is an example of a light receiver.

The first lens unit 12 is composed of a collimator lens, a cylindrical lens, or the like, and transmits the laser beam L emitted from the LD 11, thereby irradiating the polygon mirror 13 with the laser beam L. The second lens unit 14 is composed of an f-O lens or a cylindrical lens, and transmits the laser beam L reflected from the polygon mirror 13, thereby irradiating the photosensitive member 1 with the laser beam L.

The polygon mirror 13 is composed of six mirror surfaces, and is rotated by the brushless motor 20. If the polygon mirror 13 rotates at a high speed, the laser beam L emitted from the LD 11 is periodically deflected, whereby scan lines are sequentially formed on the photosensitive member 1 through the second lens unit 14.

The BD 15 is disposed so as to be able to receive a laser beam L deflected by the polygon mirror 13 before the laser beam L reaches the photosensitive member 1. The BD 15 outputs a BD signal having an output value depending on whether a laser beam L has been received. The BD signal can be used to determine a writing timing of each scan line by the laser beam L. Also, the BD 15 may be disposed so as to be able to receive a laser beam L deflected by the polygon mirror 13 after the laser beam L reaches the photosensitive member 1.

The brushless motor 20 is a 3-phase brushless DC motor, and includes a stator 22 having coils of a U phase, a V phase, and a W phase disposed thereon, and a rotor 23 having permanent magnets disposed therein. Also, in the brushless motor 20, the coils are connected by star connection. The polygon mirror 13 rotates integrally with the rotor 23.

The control board 21 includes a drive circuit 24 which performs driving control on the brushless motor 20, a voltage detecting circuit 25 which detects an induced voltage generated in each coil of the brushless motor 20, a speed adjusting circuit 26 which adjusts the rotation speed of the brushless motor 20, and a switching circuit 27 which switches between actual-speed input signals to be input to the speed adjusting circuit 26. The drive circuit 24 includes an inverter 241 which switches between supply and interruption of power to each coil of the brushless motor 20, and the speed adjusting circuit 26 includes a feedback circuit 261 and a PWM circuit 262. The circuits which are included in the control board 21 are composed of at least one ASIC. The control board 21 performs light emission control on the LD 11, and rotation speed control on the brushless motor 20, according to instructions from the CPU 31.

Also, the printer 100 detects the position of the rotor 23 without using any position detecting element such as a Hall element. Specifically, the control board 21 detects the position of the rotor 23 on the basis of an induced voltage which is generated in each coil according to rotation of the rotor 23 relative to the stator 22.

Now, detection of the position of the rotor 23 based on an induced voltage will be described. If the rotor 23 rotates, the S poles and N poles of the magnets alternately approach each coil constituting the stator 22. As a result, the magnetic flux in each coil varies, whereby an induced voltage is generated in the corresponding coil. The waveform of the induced voltage periodically varies between a level in a case where an S pole is close to the corresponding coil and another level in a case where an N pole is close to the corresponding coil. Therefore, it is possible to detect the position of the rotor 23, that is, what is the polarity of a magnet to the corresponding coil, by detecting the induced voltage.

In order to detect the induced voltage described above, the voltage detecting circuit 25 has three detectors corresponding to the coils, respectively. Each detector outputs a detection signal according to a potential difference between an end point P of a corresponding coil (an end point of a corresponding coil connected to the control board 21) and the neutral point Q of the star connection. The control board 21 converts the detection signal received from each detector into a signal (hereinafter, referred to as a FG signal) whose level is inverted according to variation in the induced voltage, that is, change in the polarity of a magnet approaching a corresponding coil, by a converter or the like, and uses the FG signal.

Figure 4:
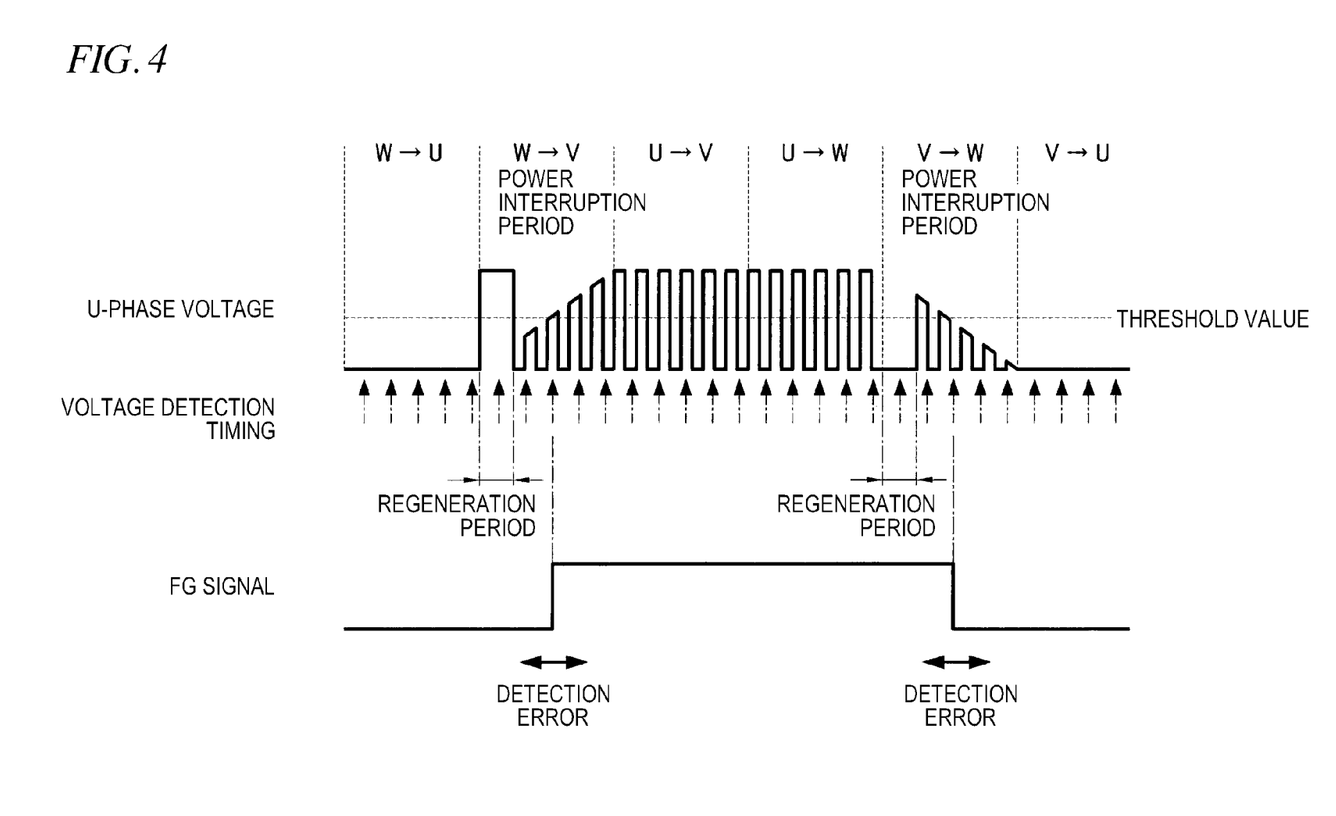
FIG. 4 is a timing chart illustrating the waveforms of a U-phase voltage and an FG signal which is obtained from the U-phase voltage.

FIG. 4 shows the waveforms of a U-phase detection voltage and a FG signal which is acquired from the U-phase detection voltage. As shown in FIG. 4, if the detection voltage of the U-phase coil in a power interruption period becomes higher than a threshold value, the FG signal corresponding to the U phase varies from an OFF state to an ON state. Meanwhile, if the detection voltage of the U-phase coil in a power interruption period becomes lower than the threshold value, the FG signal corresponding to the U phase varies from the ON state to the OFF state. The voltage detecting circuit 25 detects the voltage value of each phase at a specific timing of a PWM period, and generates a FG signal of each phase.

On the occasion of controlling the rotation speed of the brushless motor 20, the control board 21 can perform two kinds of rotation speed control, that is, rotation speed control based on the induced voltage generated in each coil, and rotation speed control based on the BD signal representing the light receiving timing of the laser beam L.

In a case of performing rotation speed control based on the induced voltage, the control board 21 uses the switching circuit 27 to switch a signal to be input to the speed adjusting circuit 26 into an FG signal. Then, the feedback circuit 261 of the speed adjusting circuit 26 outputs an adjusted value according to a rotation speed obtained by the FG signal, as an adjusted value relative to a target rotation speed. Thereafter, the PWM circuit 262 of the speed adjusting circuit 26 generates a power supply/interruption signal according to the adjusted value, and inputs the power supply/interruption signal to the drive circuit 24. The drive circuit 24 controls the inverter 241 on the basis of the power supply/interruption signal such that the inverter switches the power supply/interruption state of each coil. As a result, the rotor 23 rotates, whereby the polygon mirror 13 is rotated.

Meanwhile, in a case of performing rotation speed control based on the BD signal, the control board 21 uses the switching circuit 27 to switch the signal to be input to the speed adjusting circuit 26 to the BD signal. Then, the LD 11 is turned on. Thereafter, the speed adjusting circuit 26 generates a power supply/interruption signal according to a rotation speed obtained by the BD signal, and inputs the power supply/interruption signal to the drive circuit 24. The drive circuit 24 switches the power supply/interruption state of each coil on the basis of the power supply/interruption signal. Also, switching in rotation speed control will be described below.

Subsequently, rotation speed control on the brushless motor 20 will be described. In rotation speed control on the brushless motor 20, the control board 21 determines a switch rotation speed to be a rotation speed for switching from rotation speed control based on the induced voltage to rotation speed control based on the BD signal. Thereafter, the control board 21 performs rotation speed control based on the induced voltage from when the brushless motor is activated to when the brushless motor reaches the switch rotation speed, and performs rotation speed control based on the BD signal after the brushless motor reaches the switch rotation speed.

In a case of rotating the brushless motor 20 for rotating the polygon mirror 13, in a low-speed range, if the control board 21 performs rotation speed control based on the BD signal, the laser beam L moves on the photosensitive member 1 at a low speed, and thus damage to the photosensitive member 1 is feared. For this reason, in rotation speed control on the brushless motor 20, during activation, the control board 21 performs rotation speed control based on the induced voltage.

Meanwhile, in a high-speed range, if rotation speed control based on the induced voltage is performed, jitter increases, and thus the accuracy of the FG signal decreases. As one of factors which increases jitter, a regeneration current which is generated when the power supply/interruption state of a coil is switched can be considered.

For example, as shown in FIG. 4, if power supply to the U-phase coil is interrupted, in the power interruption period of the U phase, immediately after power supply is interrupted, there is a regeneration period when the regeneration current is generated. In the regeneration period, the voltage value is fixed, and thus it is impossible to normally detect the induced voltage. That is, immediately after start of the power interruption period, a period when it is impossible to detect the induced voltage occurs. The regeneration period is an example of a reference-disabled period.

Figure 5:
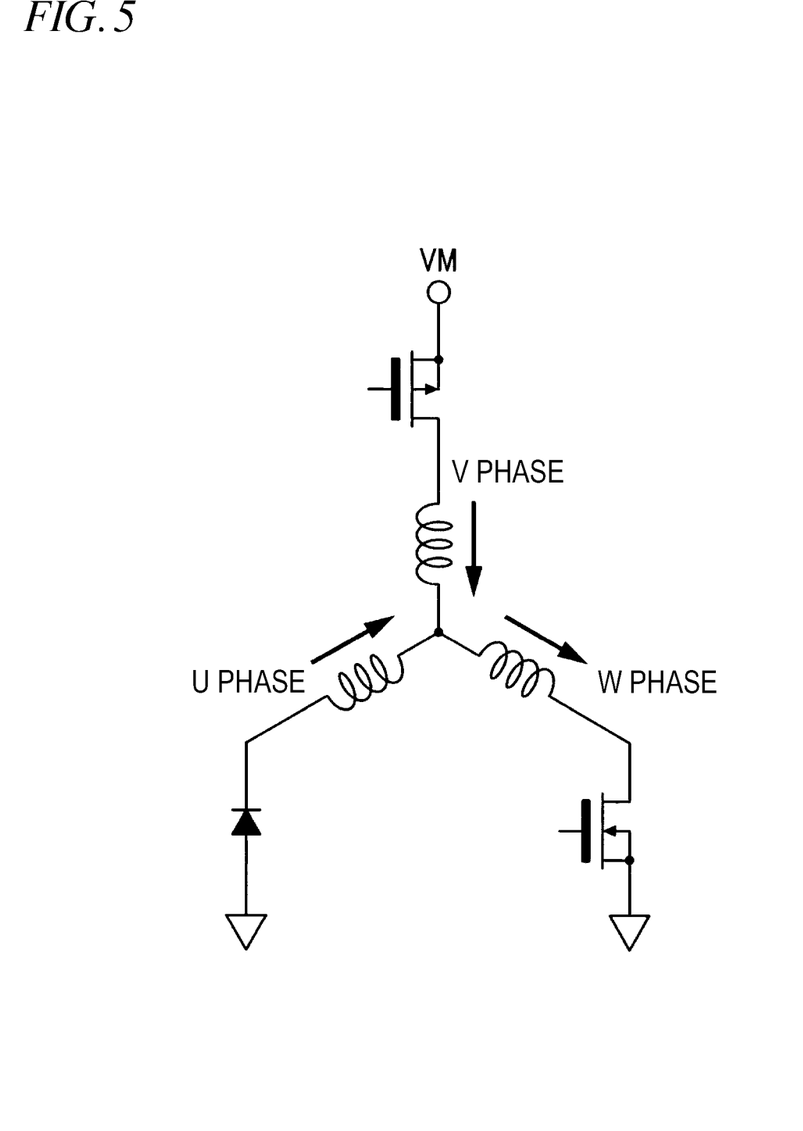
FIG. 5 is a view illustrating the concept of a regeneration current after immediately after switching to a current flowing from a V-phase coil to a W-phase coil.

The length of the above described regeneration period is obtained as follows. For example, immediately after switching to a current to flow from the V-phase coil to the W-phase coil, in the U-phase coil, a regeneration current having the opposite polarity is generated to flow to the neutral point as shown in FIG. 5. If the coils of three phases have the same inductance L like in the brushless motor 20 of the present embodiment, the voltage of the neutral point becomes about ⅓ of a power supply voltage VM. Therefore, a voltage applied to the U-phase coil becomes about VM/3. Further, from V=LdI/dt, the current varies at V/3L. If it is assumed that a current (hereinafter, referred to as limited current I) having the upper limit current value flowed in coils when a current was applied to flow from the U-phase coil to the W-phase coil, a time when a current flowing in the U-phase coil becomes 0 becomes 3IL/V. This time becomes the length Treg of the regeneration period.

The above described length Treg (=3IL/V) of the regeneration period is a value irrelevant to the rotation speed of the brushless motor 20. That is, even if the rotation speed increases, the length Treg of the regeneration period does not vary. Meanwhile, the length of one power interruption period shortens as the rotation speed increases. That is, as the rotation speed increases, the ratio of the regeneration period to the power interruption period tends to increase, and the accuracy of the FG signal tends to decrease.

First, the printer 100 activates the brushless motor 20 by rotation speed control based on the induced voltage. Then, even before the brushless motor 20 reaches the target rotation speed, the printer 100 performs switching to rotation speed control based on the BD signal before influence of the regeneration period becomes strong.

The procedure of a motor start-up process of implementing the above described rotation speed control will be described with reference to the flow chart of FIG. 6. When the brushless motor 20 is in a stop state, if a command for activating the brushless motor 20 is input, the motor start-up process is performed by the CPU 31 or the control board 21.

In the motor start-up process, first, in STEP S01, a switch rotation speed Y is determined as a rotation speed for switching from rotation speed control based on the induced voltage to rotation speed control based on the BD signal. The switch rotation speed Y is a speed different from the final target rotation speed. Further, the switch rotation speed Y is a rotation speed at which a length from the start timing of the power interruption period to a timing when the induced voltage reaches the threshold value does not become shorter than the length Treg of the regeneration period. Specifically, when the timing when the induced voltage reaches the threshold value is about the intermediate time of the power interruption period, the switch rotation speed Y needs only to be a rotation speed at which the length of one power interruption period does not become shorter than twice a length (Treg×2) which is twice the length Treg.

After the switch rotation speed Y is determined, in STEP S02, rotation of the brushless motor 20 is started. At this time, rotation speed control based on the induced voltage is performed. Next, in STEP S03, it is determined whether the current rotation speed of the brushless motor 20 exceeds the switch rotation speed Y. Until the rotation speed exceeds the switch rotation speed Y ("NO" in STEP S03), rotation speed control based on the induced voltage is kept.

If the rotation speed exceeds the switch rotation speed Y ("YES" in STEP S03), in STEP S04, switching to rotation speed control based on the BD signal is performed. That is, before it becomes easy to be influenced by the regeneration current, the LD 11 is turned on, and switching to rotation speed control based on the BD signal is performed.

After STEP S04, if the rotation speed reaches the target rotation speed, switching to constant speed rotation control is performed in STEP 505. If the rotation speed reaches the target rotation speed, the start-up period of the brushless motor 20 finishes. After STEP 505, the motor start-up process finishes. Also, in a case where the target rotation speed is lower than the switch rotation speed, switching to rotation speed control based on the BD signal may be performed at the timing when the rotation speed reaches the target rotation speed, and the motor start-up process may finish, or even after the rotation speed reaches the target rotation speed, rotation speed control based on the induced voltage may be kept, and the motor start-up process may finish.

Also, in the motor start-up process described above, if switching to rotation speed control based on the BD signal is performed at the timing when the rotation speed exceeds the switch rotation speed Y, influence of the regeneration current is suppressed. However, at any timing before the brushless motor reaches a rotation speed at which influence of the regeneration period becomes strong (in the present embodiment, a rotation speed at which the length of one power interruption period becomes shorter than a length which is twice the length of the regeneration period), for example, at a timing before the rotation speed exceeds the switch rotation speed Y, the limited current I may be reduced. As described above, the length Treg of the regeneration period is determined by 3IL/V. Therefore, it is possible to reduce the regeneration period by reducing the limited current I. As a result, the ratio of the regeneration period to the power interruption period decreases, and thus it is possible to further reduce influence of the regeneration current.

Subsequently, a specific example of the switch rotation speed Y which is determined in STEP S01 of the motor start-up process described above will be described.

In a case where the brushless motor 20 is a motor including an armature having 3 phases and 9 slots and a permanent magnet having 12 poles as a field pole, switching in energization phase is performed 36 (which is the least common multiple of 9 and 12) times for one period. That is, at a rotation speed X [rpm], the continuous energization time of one energization phase becomes as follows.

$$1/(X/60)/36 = 5/3X$$

For example, when the rotation speed X is 20000 [rpm], the continuous energization time of one energization phase becomes as follows.

$$1/(20000/60)/36 = 83.33 [\mu s]$$

This continuous energization time has the same length as that of one power interruption period.

Also, for example, in control when the limited current is 2 A, if it is assumed that the inductance of the coils is 100 μH, and the power supply voltage VM is 24 V, the length Treg of the regeneration period becomes as follows.

$$Treg = 3IL/V = 3 \times 2[A] \times 100[\mu H]/24[V] = 25[\mu s]$$

Since the ideal detection timing of the induced voltage is the intermediate time of the power interruption period, if the regeneration time exceeds the intermediate time of the power interruption period, the detection accuracy is more likely to decrease. For this reason, as described above, a rotation speed at which the length of one power interruption period becomes Treg×2 is defined as a rotation speed at which the accuracy of detection of the induced voltage decreases. Therefore, if a configuration in which the above described limited current is 2 A, the inductance of the coils is 100 μtH, and the power supply voltage is 24V is applied to the brushless motor 20 of the present embodiment, the rotation speed at which the accuracy of detection of the induced voltage decreases becomes as follows.

$$5/(25 [\mu s] \times 2) \times 3 = 33333.33 [rpm]$$

For this reason, a rotation speed lower than the corresponding rotation speed is determined as the switch rotation speed Y in STEP S01.

Subsequently, other factors which increase the jitter, that is, other factors which decrease the accuracy of the FG signal will be described. As factors which increase the jitter, in addition to the regeneration period, resolution shortage of the voltage detecting circuit 25 can be exemplified.

As shown in FIG. 4, the voltage detecting circuit 25 detects the voltage value of each phase at a specific timing of a PWM period. For example, in a case where a PWM frequency is 125 kHz, the voltage detecting circuit 25 detects the voltage value of each coil at intervals of 8 μs.

In a case where the brushless motor 20 has the above described configuration (a motor including an armature having 3 phases and 9 slots and a permanent magnet having 12 poles as field poles), when the rotation speed is 20000 rpm, the power interruption period becomes 83.33 μs. Therefore, at the corresponding rotation speed, a detection error of (8 [μs]/83.33 [μs]×100)% is included. This detection error also causes the power interruption period to decrease as the rotation speed increases. Therefore, as the rotation speed increases, influence on the accuracy of the FG signal increases.

Also, when the switch rotation speed is determined in STEP S01 of the motor start-up process, it is preferable to add the detection interval of the voltage detecting circuit 25, that is, the period Tpwm of the PWM frequency. In the present embodiment, in STEP S01, the switch rotation speed is defined as a rotation speed at which the length of one power interruption period does not become shorter than Treg×2. Therefore, the switch rotation speed needs only to be a rotation speed at which the length of one power interruption period does not become shorter than Treg×2+Tpwm. Therefore, it is possible to suppress not only influence of the regeneration period but also influence of resolution shortage of the voltage detecting circuit 25.

As described above, a decrease in the accuracy of the FG signal due to resolution shortage of the voltage detecting circuit 25 becomes more remarkable as the rotation speed increases. For this reason, a switch rotation speed based on the target rotation speed may be defined, and be compared with a switch rotation speed based on the regeneration period, and with reference to a lower speed of them, the switch rotation speed Y may be determined.

When the length of one power interruption period at the target rotation speed is denoted by Ttarg, and the frequency of the PWM frequency is denoted by Tpwm, the switch rotation speed based on the target rotation speed needs only to be defined as a rotation speed at which the length of one power interruption period does not become shorter than Ttarg+Tpwm.

Specifically, for example, in a case where the brushless motor 20 has the above described configuration (a motor including an armature having 3 phases and 9 slots and a permanent magnet having 12 poles as field poles), and the target rotation speed is 21000 rpm, a rotation speed at which it is estimated that the accuracy of the FG signal decreases becomes as follows.

$$5/(5/(3 \times 21000) + 8 [\mu s]) \times 3) = 171693.3 [rpm]$$

Also, in a case where the target rotation speed is 40000 rpm, a rotation speed at which it is estimated that the accuracy of the FG signal decreases becomes as follows.

$$5/(5/(3 \times 40000) + 8 [\mu s]) \times 3) = 302013.4 [rpm]$$

Before the brushless motor reaches the rotation speed at which it is estimated that the accuracy of the FG signal decreases, switching to rotation speed control based on the BD signal is performed.

Figure 6:
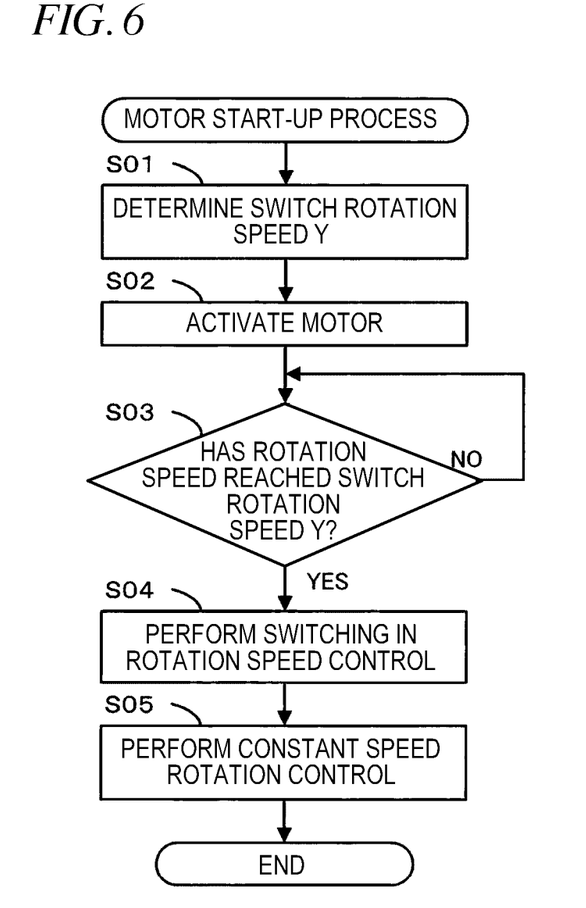
FIG. 6 is a flow chart illustrating the procedure of a motor start-up process which is performed in the printer of the embodiment.
Figure 7:
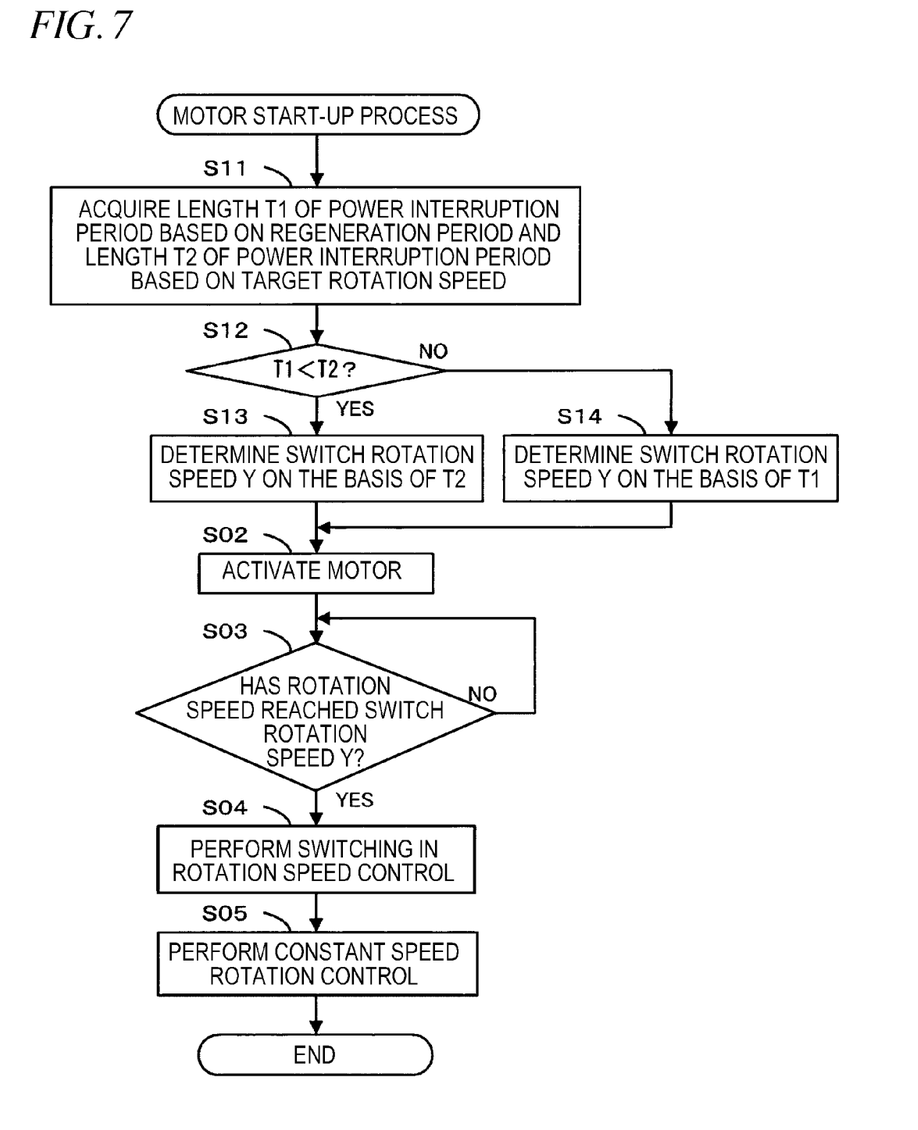
FIG. 7 is a flow chart illustrating the procedure of a motor start-up process which is performed in a printer of an application.

FIG. 7 shows an operation of a motor start-up process using a switch rotation speed based on a target rotation speed. The motor start-up process of FIG. 7 is different from the motor start-up process of FIG. 6 in the procedure of determining the switch rotation speed.

In the motor start-up process of FIG. 7, first, in STEP S11, the length T1 of one power interruption period at a switch rotation speed based on the regeneration period, and the length T2 of one power interruption period at a switch rotation speed based on the target rotation speed are acquired. Specifically, the lengths T1 and T2 of each power interruption period are defined as follow.

$$T1 = Treg \times 2 + Tpwm$$

$$T2 = Ttarg + Tpwm$$

After STEP S11, in STEP S12, whether the length T1 is shorter than length T2 is determined. In a case where the length T1 is shorter than the length T2 ("YES" in STEP S12), in STEP S13, a rotation speed at which the length of the power interruption period becomes longer than the length T2 is determined as the switch rotation speed Y of the present embodiment. Meanwhile, in a case where the length T1 is not shorter than the length T2 ("NO" in STEP S12), in STEP S14, a rotation speed at which the length of the power interruption period becomes longer than the length T1 is determined as the switch rotation speed Y of the present embodiment.

After STEP S13 or STEP S14, the motor start-up process proceeds to STEP S12, and the processes of STEP S02 and the subsequent steps are identical to those of the motor start-up process of FIG. 6. Like in the motor start-up process of FIG. 7, since the switch rotation speed Y is determined by comparison between the switch rotation speed based on the target rotation speed and the switch rotation speed based on the regeneration period, it is possible to further suppress a decrease in the accuracy of the FG signal.

As described above in detail, in the printer 100 of the present embodiment, in control on the rotation speed of the brushless motor 20, in the start-up period of the brushless motor 20, rotation speed control based on the induced voltage is performed until the brushless motor reaches the switch rotation speed at which the rotation speed is unlikely to be influenced by the regeneration period, and after the brushless motor reaches the switch rotation speed, switching to rotation speed control based on the BD signal is performed. That is, before the brushless motor reaches the target rotation speed, whereby switching to constant speed rotation control is performed, the LD 11 is turned on and rotation speed control based on the BD signal is started. Therefore, before the detection accuracy decreases, switching in rotation speed control is performed. As a result, the rotation speed is stable. Also, in a low-speed range before switching in rotation speed control is performed, since rotation speed control based on the induced voltage is performed, damage to the photosensitive member 1 which is irradiated with the laser beam L is few.

The present embodiment is merely an example, and does not limit the present invention. Therefore, the present invention can be improved and modified in various forms without departing from the scope. For example, the image forming apparatus is not limited to a printer, but can be applied to any apparatuses having a printing function, such as a copy machine, a FAX, and a multi-function apparatus. Also, the printer 100 of the embodiment is a monochrome printer and has only one process unit 50. However, the printer 100 may be a color printer having a plurality of process units.

Also, in the embodiment, on the occasion of acquiring the induced voltage generated in a coil, the potential difference between the end point P of the coil and the neutral point Q of the star connection is detected, that is, the induced voltage is detected. However, the induced voltage may not need to be detected. For example, while power is not supplied to the other coils, since the potential of the neutral point Q does not significantly vary, it is possible to estimate the induced voltage only with reference to the potential of the end point P of the coil. That is, instead of the induced voltage, a value related to the induced voltage may be referred to.

Also, in the motor start-up process of the embodiment, switching to rotation speed control based on the BD signal is performed when the rotation speed exceeds the switch rotation speed Y. However, switching to rotation speed control based on the BD signal may be performed when the brushless motor reaches the target rotation speed. In this case, when the rotation speed exceeds the switch rotation speed, it is needed to reduce the limited current, thereby suppressing influence of the regeneration current. That is, if a process of suppressing influence of the regeneration current by a method other than switching to rotation speed control based on the BD signal is performed when the rotation speed exceeds the switch rotation speed Y, switching to rotation speed control based on the BD signal does not need to be performed when the rotation speed exceeds the switch rotation speed Y.

Also, in the motor start-up process of the embodiment, the length Treg of the regeneration period is used to determine the switch rotation speed Y. However, the switch rotation speed Y may be determined on the basis of the target rotation speed without using the length Treg of the regeneration period. That is, the switch rotation speed may be set to a rotation speed at which the length of one power interruption period does not become shorter than Ttarg+Tpwm.

Also, in the embodiment, the upper limit value of the rotation speed is defined, for example, as a rotation speed at which the length of one power interruption period does not become shorter than a length (Treg×2) which is twice the length Treg, and in a rotation speed range satisfying the upper limit condition, it is considered that the condition of the switch rotation speed is satisfied. However, a lower limit value may be defined. The lower limit value may be a value at which damage to the photosensitive member 1 is allowed.

Also, the processes disclosed in the embodiment may be performed by a single CPU, a plurality of CPUs, hardware such as an ASIC, or a combination thereof. Further, the processes disclosed in the embodiment can be implemented in various forms such as a recording medium retaining a program for performing the processes, or a method.

The image forming apparatus which is disclosed in this specification has the polygon mirror whose driving source is the brushless motor, and performs rotation speed control based on an induced voltage which is generated in a coil of the brushless motor in a non-conducting period of the coil, with reference to a detected value related to the induced voltage. Further, in a start-up period of the brushless motor, the image forming apparatus performs switching from rotation speed control based on the induced voltage to rotation speed control based on the light receiving timing of the light beam such that a length from the start timing of a power interruption period of the coil to a timing when the detected value reaches the reference value is prevented from becoming shorter than the length of a reference-disabled period (regeneration period) in which the induced voltage cannot be detected due to a regeneration current.

That is, according to change in the power supply state, the regeneration current is generated in the coil. Therefore, at the time of acquiring the detected value related to the induced voltage in the power interruption period, in the power interruption period, a reference-disabled period in which the induced voltage cannot be detected due to a regeneration current exists. The ratio of the reference-disabled period to the power interruption period increases as the rotation speed increases. Therefore, in the specific range in which it is difficult to be influenced by the reference-disabled period, the image forming apparatus which is disclosed in this specification performs switching from rotation speed control based on the induced voltage to rotation speed control based on the light receiving timing of the light beam. Therefore, before the detection accuracy decreases, switching in rotation speed control is performed. As a result, the rotation speed is stable.

If the reference-disabled period is specified on the basis of the above described three factors, it is possible to control the switching timing with high accuracy.

In a case of referring to the detected value related to the induced voltage on the basis of the period of the PWM frequency, there is a difference between a timing when the detected value exceeds the reference value and a timing when the detected value is referred to. For this reason, if the period of the PWM frequency is included in the requirements, it is possible to expect more accurate control.

In a case of referring to the detected value related to the induced voltage on the basis of the period of the PWM frequency, there is a difference between a timing when the detected value exceeds the reference value and a timing when the detected value is referred to. For this reason, if the period of the PWM frequency is included in the requirements, it is possible to expect more accurate control.

The power interruption period at the target rotation speed decreases as the target rotation speed increases. Therefore, it is possible to expect more stable rotation control by changing the requirements of the specific range according to the target rotation speed.

If the limited current is reduced (that is, the reference-disabled period due to the regeneration current is reduced) before switching to rotation speed control based on the BD signal, it is possible to further stabilize rotation speed control until switching to rotation speed control based on the BD signal is performed.

If the light beam is emitted from a timing before switching in rotation speed control, that is, from a timing before the rotation speed reaches the target rotation speed, it is possible to surely perform switching to rotation speed control based on the light receiving timing of the light beam.

Also, in this specification, there is disclosed an image forming apparatus which includes a light source that emits a light beam, a polygon mirror that reflects the light beam emitted from the light source, a brushless motor that rotates the polygon mirror, a light receiver that receives the light beam reflected by the polygon mirror, and a controller. In this image forming apparatus, the controller performs a phase switching process of referring to a detected value related to an induced voltage which is generated in a coil of the brushless motor in a power interruption period of the corresponding coil during rotation of the brushless motor and performing phase switching on the basis of a timing when the detected value reaches a reference value. Further, in a specific range which is a rotation speed range which is in a start-up period when the brushless motor is started up from a stop state to a target rotation speed and in which a length from the start timing of a power interruption period to a timing when the detected value reaches the reference value does not become shorter than the length of a reference-disabled period in which the induced voltage cannot be detected due to a regeneration current attributable to phase switching in the phase switching process, the controller performs a current decreasing process of decreasing the upper limit value of a current which flows in the coil of the brushless motor.

Also, in this specification, there is disclosed an image forming apparatus which includes a light source that emits a light beam, a polygon mirror that reflects the light beam emitted from the light source, a brushless motor that is rotated under PWM control, thereby rotating the polygon mirror, a light receiver that receives the light beam reflected by the polygon mirror, and a controller. In this image forming apparatus, the controller performs a phase switching process of referring to a detected value related to an induced voltage which is generated in a coil of the brushless motor in a power interruption period of the corresponding coil during rotation of the brushless motor, with reference to the period of a PWM frequency, and performing phase switching on the basis of a timing when the detected value reaches a reference value. Further, in a specific range which is a rotation speed range which is in a start-up period when the brushless motor is started up from a stop state to a target rotation speed and in which one power interruption period is longer than a time which is the sum of the period of the PWM frequency and the length of one reference-disabled period at the target rotation speed, the controller performs a control switching process of performing switching from rotation speed control based on the induced voltage according to the phase switching process to rotation speed control based on the light receiving timing of the light beam by the light receiver.

Also, control methods and computer programs for implementing the functions of the above described image forming apparatus, and computer-readable storage media retaining the corresponding computer programs also are new and useful.

According to the present disclosure, a technology for performing switching in rotation speed control at appropriate timings in an image forming apparatus having a brushless motor for driving a polygon mirror is implemented.

What is claimed is:

1. An image forming apparatus comprising:
   a light source configured to emit a light beam;
   a polygon mirror configured to reflect the light beam emitted from the light source;
   a brushless motor including a plurality of coils, the brushless motor being configured to rotate the polygon mirror;
   a light receiver configured to receive the light beam reflected by the polygon mirror; and
   a controller configured to:
   perform driving control on the brushless motor by switching between supply and interruption of power to each of the plurality of coils;
   detect a value related to an induced voltage which is generated in at least one of the plurality of coils in a period of the interruption of the power during the brushless motor is rotated;
   perform a first control of referring to the detected value and performing phase switching based on a timing when the detected value reaches a reference value; and
   in a start-up period when the brushless motor is started up from a stop state, perform a second control of performing switching from first rotation speed control based on the induced voltage according to the first control to second rotation speed control based on the light receiving timing of the light beam by the light receiver in a specific range in which a length from a start timing of an interruption period of the power to a timing when the detected value reaches the reference value does not become shorter than a length of a reference-disabled period in which the induced voltage cannot be detected due to a regeneration current attributable to the phase switching in the first control, the second rotation speed control operable without regard to the induced voltage;

after the second control performs switching from the first rotation speed control to the second rotation speed control, perform the second rotation speed control and not the first rotation speed control to increase a rotation speed of the polygon mirror to reach a target rotation speed; and when the rotation speed of the polygon mirror reaches the target rotation speed, perform a constant speed control based on the light receiving timing of the light beam by the light receiver, and wherein the specific range is a range of a rotation speed slower than the target rotation speed.

2. The image forming apparatus according to claim 1, wherein the length of the reference-disabled period is specified based on an upper limit value of a current value which flows in the coil of the brushless motor, a voltage value which is applied to the coil of the brushless motor, and inductance of the coil of the brushless motor.

3. The image forming apparatus according to claim 1, wherein the brushless motor is rotated under PWM control, and in the first control, the controller refers to the detected value on the basis of the period of a PWM frequency, and the specific range is further defined by a condition in which the interruption period is longer than a time which is the sum of a length which is twice the length of the reference-disabled period and the period of the PWM frequency.

4. The image forming apparatus according to claim 1, wherein:

the brushless motor is rotated under PWM control, and in the first control, the controller refers to the detected value on the basis of a period of a PWM frequency, and the specific range is further defined by a condition in which the interruption period is longer than a time which is the sum of a period of the PWM frequency and the length of the one interruption period at the target rotation speed.

5. The image forming apparatus according to claim 1, wherein:

the brushless motor is rotated under PWM control, and in the first control, the controller refers to the detected value on the basis of the period of a PWM frequency, and the specific range is further defined by a condition in which the one interruption period is longer than a time which is the sum of a length which is twice the length of the reference-disabled period and the period of the PWM frequency and is longer than a time which is the sum of the period of the PWM frequency and the length of the one interruption period at the target rotation speed.

6. The image forming apparatus according to claim 1, wherein in the specific range, the controller performs a third control of decreasing an upper limit value of a current which flows in one of the plurality of coils.

7. The image forming apparatus according to claim 1, wherein before switching from the first rotation speed control to the second rotation speed control, the controller performs a fourth control of controlling the light source to emit the light beam.

8. The image forming apparatus according to claim 1, wherein the brushless motor is a 3-phase brushless DC motor, and the reference disabled period is defined by $3IL/V$ where I is a limit current flowed in coils of the 3-phase brushless DC motor, V is a voltage applied to the coils, and L is an inductance of the coils.

9. A control method of an image forming apparatus which includes a light source configured to emit a light beam, a polygon mirror configured to reflect the light beam emitted from the light source, a brushless motor configured to rotate the polygon mirror, and a light receiver configured to receive the light beam reflected by the polygon mirror, the method comprising:

performing driving control on the brushless motor by switching between supply and interruption of power to each of the plurality of coils;

detecting a value related to an induced voltage which is generated in at least one of the plurality of coils in a period of the interruption of the power during the brushless motor is rotated;

performing a first control of referring to the detected value and performing phase switching based on a timing when the detected value reaches a reference value; and in a start-up period when the brushless motor is started up from a stop state, performing a second control of performing switching from first rotation speed control based on the induced voltage according to the first control to second rotation speed control based on the light receiving timing of the light beam by the light receiver in a specific range in which a length from a start timing of an interruption period of the power to a timing when the detected value reaches the reference value does not become shorter than a length of a reference-disabled period in which the induced voltage cannot be detected due to a regeneration current attributable to the phase switching in the first control, the second rotation speed control operable without regard to the induced voltage;

after the second control performs switching from the first rotation speed control to the second rotation speed control, performing the second rotation speed control and not the first rotation speed control to increase a rotation speed of the polygon mirror to reach a target rotation speed; and when the rotation speed of the polygon mirror reaches the target rotation speed, performing a constant speed control based on the light receiving timing of the light beam by the light receiver, and wherein the specific range is a range of a rotation speed slower than the target rotation speed.

10. The control method according to claim 9, wherein the length of the reference-disabled period is specified based on an upper limit value of a current value which flows in the coil of the brushless motor, a voltage value which is applied to the coil of the brushless motor, and inductance of the coil of the brushless motor.

11. The control method according to claim 9, wherein the brushless motor is rotated under PWM control, and in the first control, the controller refers to the detected value on the basis of the period of a PWM frequency, and the specific range is further defined by a condition in which the interruption period is longer than a time which is the sum of a length which is twice the length of the reference-disabled period and the period of the PWM frequency.

12. The control method according to claim 9, wherein:
the brushless motor is rotated under PWM control, and
in the first control, the controller refers to the detected value on the basis of a period of a PWM frequency, and
the specific range is further defined by a condition in which the interruption period is longer than a time which is the sum of a period of the PWM frequency and the length of the one interruption period at the target rotation speed.

13. The control method according to claim 9, wherein:
the brushless motor is rotated under PWM control, and
in the first control, the controller refers to the detected value on the basis of the period of a PWM frequency, and
the specific range is further defined by a condition in which the one interruption period is longer than a time which is the sum of a length which is twice the length of the reference-disabled period and the period of the PWM frequency and is longer than a time which is the sum of the period of the PWM frequency and the length of the one interruption period at the target rotation speed.

14. The control method according to claim 9, wherein in the specific range, the controller performs a third control of decreasing an upper limit value of a current which flows in one of the plurality of coils.

15. The control method according to claim 9, wherein
before switching from the first rotation speed control to the second rotation speed control, the controller performs a fourth control of controlling the light source to emit the light beam.

16. The control method according to claim 9, wherein the brushless motor is a 3-phase brushless DC motor, and the reference-disabled period is defined by 3IL/V where I is a limit current flowed in coils of the 3-phase brushless DC motor, V is a voltage applied to the coils, and L is an inductance of the coils.

17. A non-transitory computer readable storage medium storing a program to be executed by an image forming apparatus which includes a light source configured to emit a light beam, a polygon mirror configured to reflect the light beam emitted from the light source, a brushless motor configured to rotate the polygon mirror, and a light receiver configured to receive the light beam reflected by the polygon mirror, the program causing the image forming apparatus to execute:
performing driving control on the brushless motor by switching between supply and interruption of power to each of the plurality of coils;
detecting a value related to an induced voltage which is generated in at least one of the plurality of coils in a period of the interruption of the power during the brushless motor is rotated;
performing a first control of referring to the detected value and performing phase switching based on a timing when the detected value reaches a reference value; and
in a start-up period when the brushless motor is started up from a stop state to a target rotation speed, performing a second control of performing switching from first rotation speed control based on the induced voltage according to the first control to second rotation speed control based on the light receiving timing of the light beam by the light receiver in a specific range in which a length from a start timing of an interruption period of the power to a timing when the detected value reaches the reference value does not become shorter than a length of a reference-disabled period in which the induced voltage cannot be detected due to a regeneration current attributable to the phase switching in the first control, the second rotation speed control operable without regard to the induced voltage;
after the second control performs switching from the first rotation speed control to the second rotation speed control, performing the second rotation speed control and not the first rotation speed control to increase a rotation speed of the polygon mirror to reach a target rotation speed; and
when the rotation speed of the polygon mirror reaches the target rotation speed, performing a constant speed control based on the light receiving timing of the light beam by the light receiver, and
wherein the specific range is a range of a rotation speed slower than the target rotation speed.

18. The non-transitory computer readable storage medium according to claim 17, wherein
the length of the reference-disabled period is specified based on an upper limit value of a current value which flows in the coil of the brushless motor, a voltage value which is applied to the coil of the brushless motor, and inductance of the coil of the brushless motor.

19. The non-transitory computer readable storage medium according to claim 17, wherein
the brushless motor is rotated under PWM control, and
in the first control, the controller refers to the detected value on the basis of the period of a PWM frequency, and
the specific range is further defined by a condition in which the interruption period is longer than a time which is the sum of a length which is twice the length of the reference-disabled period and the period of the PWM frequency.

20. The non-transitory computer readable storage medium according to claim 17, wherein:
the brushless motor is rotated under PWM control, and
in the first control, the controller refers to the detected value on the basis of a period of a PWM frequency, and
the specific range is further defined by a condition in which the interruption period is longer than a time which is the sum of a period of the PWM frequency and the length of the one interruption period at the target rotation speed.

21. The non-transitory computer readable storage medium according to claim 17, wherein:
the brushless motor is rotated under PWM control, and
in the first control, the controller refers to the detected value on the basis of the period of a PWM frequency, and
the specific range is further defined by a condition in which the one interruption period is longer than a time which is the sum of a length which is twice the length of the reference-disabled period and the period of the PWM frequency and is longer than a time which is the sum of the period of the PWM frequency and the length of the one interruption period at the target rotation speed.

22. The non-transitory computer readable storage medium according to claim 17, wherein in the specific range, the controller performs a third control of decreasing an upper limit value of a current which flows in one of the plurality of coils.

23. The non-transitory computer readable storage medium according to claim 17, wherein the brushless motor is a 3-phase brushless DC motor, and the reference-disabled period is defined by $3IL/V$ where I is a limit current flowed in coils of the 3-phase brushless DC motor, V is a voltage applied to the coils, and L is an inductance of the coils.

* * * * *